(12) United States Patent
Grimaldi et al.

(10) Patent No.: US 9,035,002 B2
(45) Date of Patent: May 19, 2015

(54) PROCESS OF FREE-RADICAL POLYMERIZATION OR CROSSLINKING IN THE PRESENCE OF A SELECTED ORGANIC PEROXIDE PREPARED BY AN EX SITU PROCESS

(75) Inventors: Sandra Grimaldi, Sainte-Foy-les-Lyon (FR); Jean-Marc Corpart, Vourles (FR)

(73) Assignee: Arkema France, Colombes (FR)

( * ) Notice: Subject to any disclaimer, the term of this patent is extended or adjusted under 35 U.S.C. 154(b) by 931 days.

(21) Appl. No.: 12/298,571

(22) PCT Filed: Apr. 27, 2007

(86) PCT No.: PCT/EP2007/054142
§ 371 (c)(1),
(2), (4) Date: Oct. 27, 2008

(87) PCT Pub. No.: WO2007/125092
PCT Pub. Date: Nov. 8, 2007

(65) Prior Publication Data
US 2009/0076234 A1    Mar. 19, 2009

Related U.S. Application Data

(60) Provisional application No. 60/815,337, filed on Jun. 21, 2006.

(30) Foreign Application Priority Data

Apr. 27, 2006 (EP) .................................. 06300416

(51) Int. Cl.
  *C08F 2/01*  (2006.01)
  *C08F 2/00*  (2006.01)
  *F28D 21/00* (2006.01)

(52) U.S. Cl.
  CPC .............. *C08F 2/00* (2013.01); *C08F 2410/00* (2013.01); *Y10S 165/051* (2013.01); *Y10S 165/00* (2013.01); *F28D 2021/0022* (2013.01); *C08F 2/01* (2013.01); *C08F 2400/02* (2013.01)

(58) Field of Classification Search
  CPC ................ C08F 2/01; Y10S 165/051–165/071
  See application file for complete search history.

(56) References Cited

U.S. PATENT DOCUMENTS

3,950,375 A    4/1976 McKee
3,978,914 A *  9/1976 Phillips ............................ 165/7

(Continued)

FOREIGN PATENT DOCUMENTS

DE    10257239    7/2004
FR    2253760     7/1975

(Continued)

OTHER PUBLICATIONS

Floyd, T. M. et al., "Novel Liquid Phase Microreactors for Safe Production of Hazardous Specialty Chemicals", Microreact. Technol. Ind. Prospects, Proc. Int. Conf., 3rd 1999, 171-180.*

(Continued)

*Primary Examiner* — Richard A Huhn
(74) *Attorney, Agent, or Firm* — Lynn B. Morreale

(57) ABSTRACT

The invention relates to free-radical polymerization and free-radical cross-linking and more particularly provides a process of free-radical polymerization or cross-linking wherein at least one polymerizable monomer or at least one compound to be cross-linked is contacted in the presence of at least one selected organic peroxides, characterized in that the organic peroxide is prepared continuously by an ex situ process with the aid of a closed plate exchanger. In the process according to the invention, it's possible to introduce the above selected organic peroxide continuously during the polymerization or cross-linking reaction.

12 Claims, 1 Drawing Sheet

(56) References Cited

U.S. PATENT DOCUMENTS

| | | | |
|---|---|---|---|
| 4,075,236 A * | 2/1978 | Wagle et al. | 560/302 |
| 4,635,712 A * | 1/1987 | Baker et al. | 165/82 |
| 4,999,402 A * | 3/1991 | Yamamoto et al. | 525/305 |
| 5,700,856 A | 12/1997 | Smith | |
| 6,098,701 A * | 8/2000 | Blomgren | 165/67 |
| 6,117,409 A | 9/2000 | Bertsch-Frank et al. | |
| 6,258,906 B1 | 7/2001 | Bodart | |
| 6,433,208 B1 | 8/2002 | Cozens | |
| 6,617,408 B2 | 9/2003 | Bodart | |
| 6,878,840 B2 | 4/2005 | Bodart | |
| 6,892,797 B2 * | 5/2005 | Beddome et al. | 165/81 |
| 7,087,693 B2 | 8/2006 | Tammer et al. | |
| 7,332,139 B2 | 2/2008 | Schutte et al. | |
| 2004/0109798 A1 | 6/2004 | Chopard et al. | |
| 2004/0179983 A1 | 9/2004 | Balan et al. | |
| 2005/0119501 A1 * | 6/2005 | Tammer et al. | 562/4 |
| 2005/0131179 A1 * | 6/2005 | Cozens et al. | 526/230.5 |
| 2007/0053808 A1 | 3/2007 | Markowz | |
| 2009/0043122 A1 * | 2/2009 | Azzawi et al. | 560/129 |
| 2009/0182162 A1 * | 7/2009 | Corpart et al. | 558/264 |
| 2010/0022794 A1 * | 1/2010 | Appel et al. | 560/129 |
| 2010/0036152 A1 * | 2/2010 | Appel et al. | 560/103 |

FOREIGN PATENT DOCUMENTS

| | | | | |
|---|---|---|---|---|
| GB | 671375 | * | 5/1952 | F28D 7/1653 |
| GB | 1055985 | | 1/1967 | |
| WO | WO 2004096871 A1 | * | 11/2004 | C08F 4/38 |
| WO | WO 2005/075419 | | 8/2005 | |

OTHER PUBLICATIONS

Hessel, V. et al., "Organic Synthesis with Microstructured Reactors," Chem. Eng. Technolo. 28, 3 pp. 267-284 (2005).

Non-Final Office Action issued in co-pending U.S. Appl. No. 12/298,568 mailed on Jan. 10, 2011.

Wootton, R. D. R. et al., "A Microfabricated Nanoreactor for Safe, Continous Generation and Use of Singlet Oxygen," Organic Process Research & Development, 6, 187-189 (2002).

Encyclopedia of Chemical Technology, Kirk-Othmer, 4th Edition, vol. 18, 1996 pp. 292-293 and 230-310.

Chemical Engineer's Handbook, R.H. Perry/C.H. Chilton, vol. 21, pp. 11-12, 1963.

* cited by examiner

PROCESS OF FREE-RADICAL POLYMERIZATION OR CROSSLINKING IN THE PRESENCE OF A SELECTED ORGANIC PEROXIDE PREPARED BY AN EX SITU PROCESS

FIELD OF THE INVENTION

The present invention relates to free-radical polymerization and free-radical cross-linking and provides more particularly for the use, in free-radical polymerization or cross linking, of free-radical organic peroxide prepared by an ex situ process with the aid of continuous reactors.

BACKGROUND OF THE INVENTION

Free-radical polymerization or cross linking reactors are fed with free-radical initiators, which may be organic peroxides, azo compounds or carbon-carbon initiators from the class of hexasubstituted ethanes (Encyclopaedia of Chemical Technology, Kirk-Othmer, Fourth Edition, Vol. 14, 1996, pages 436-53). In the majority of cases they are organic peroxides, supplied by producers of organic peroxides, and generally require a step of transport and of storage.

Organic peroxides are unstable compounds which are able to undergo thermal decomposition at higher or lower temperatures, depending on their structure. Their preparation, transport and storage consequently necessitate very substantial precautions in order to prevent any accident in the course of their handling.

In order to avoid problems relating to the regulations associated with the transport of these dangerous products, and to limit their storage, it is sometimes recommended to produce the organic peroxide directly at the site of its use.

Organic peroxides are generally prepared in conventional open reactors by discontinuous (batch) processes, this type of process being particularly suitable for the secure production of moderate amounts of peroxides (Encyclopaedia of Chemical Technology, Kirk-Othmer, Fourth Edition, Vol. 18, 1996, pages 292-293). However, not all organic peroxides can be prepared according to conventional batch conditions, owing to their instability. Some can be prepared only in solution, or must then be stabilized in the form of an emulsion or by the addition of a stabilizer. This is the case in particular for highly reactive peroxides, in other words for peroxides whose 10-hour half-life temperature is relatively low.

These drawbacks can be circumvented by producing the peroxides in situ, in other words in the reactor in which the polymerization or cross-linking is carried out. Mention may be made, for example, of U.S. Pat. No. 5,700,856, which describes the preparation of ketone peroxides in a system which contains the unsaturated polyester resin and the cross-linking accelerator.

However, this type of in situ manufacturing process for the organic peroxide does not allow the peroxide feed to the polymerization reactors to be automated. A major drawback is the lack of precision with regard to the amounts of peroxide effectively employed for the polymerization, and the need to precede each polymerization cycle by the in situ synthesis of the initiator. The productivity of the plant is limited as a result.

Proposals have also already been made to prepare the organic peroxides just adjacent to the polymerization or cross-linking reactor (ex situ synthesis).

In document FR 2253760 a peroxydicarbonate is prepared from an alkyl haloformate and an inorganic peroxide compound in the presence of water and a volatile, water-immiscible solvent, immediately before the polymerization. The whole of the reaction mixture thus obtained (organic phase and aqueous phase) is then introduced into the polymerization reactor, which is subsequently charged for the purpose of polymerization. This process does allow the organic peroxide feed to the reactors to be automated, but requires the production of an amount of initiator which is just sufficient, immediately prior to the polymerization. Furthermore, it exhibits drawbacks from the standpoint of the quality of the polymerization and the polymers obtained.

International application WO 97/27229 describes a process for manufacturing a dialkyl peroxydicarbonate solution which is particularly suitable for implementation in a process of aqueous suspension polymerization of vinyl chloride. The solutions of dialkyl peroxydicarbonate in a liquid, water-insoluble dialkyl alkanedicarboxylate can be prepared in advance in sufficient amount to feed a number of polymerization reactors, but are stored at low temperature so as not to give rise to any hazard. They may be introduced in whole or in part after the beginning of the polymerization, which allows the feed to the reactors to be automated. However, the use of the organic peroxide in the form of a solution in an ester may be detrimental to the polymerization kinetics and to the general properties of the polymers produced. Furthermore, the preparation of dialkyl peroxydicarbonate solutions involves a step of separation of the dialkyl peroxydicarbonate prepared in water, by extraction using the ester.

In international application WO 03/074573, diacyl peroxides are prepared in an aqueous medium by a peroxidation process and are transferred to a polymerization reactor within a time period of between 2 hours and 168 hours after their preparation. The reactor in which the peroxidation reaction takes place may also be connected directly to the polymerization reactor. However, it is not possible to operate in this way for highly reactive organic peroxides in respect of which the refrigeration and explosion danger demands are stringent. Furthermore, the use of a peroxide in aqueous solution is out of the question for some polymerization processes, such as bulk processes for polystyrene or polyethylene, or for the cross linking of polyester resins or polyolefins.

International application WO 05/075419 describes a multi-step process for preparing organic peroxides such as peroxydicarbonates, diacyl peroxides or peroxyesters wherein the reactants, such as acid chlorides or chloroformates, are prepared in situ from phosgene, which is also generated in situ. The peroxides thus obtained are then used directly in a polymerization reaction.

DETAILED DESCRIPTION OF THE INVENTION

Figure 1:
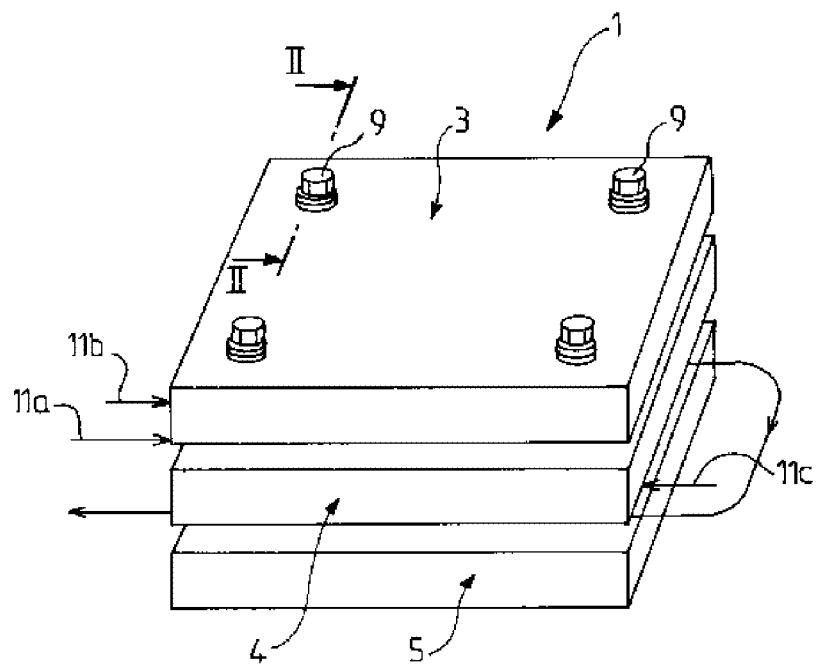
FIG. 1 is a perspective view of a device that can be used in the process of the present invention

The aim of the present invention is to overcome the various drawbacks mentioned above, and it relates to the direct use, in systems of free-radical polymerization or cross-linking, of organic peroxides prepared in micro-reactors or mini-reactors.

Direct use, for the purposes of the present invention, signifies that organic peroxides selected from the group consisting of di(n-propyl) peroxydicarbonate of CAS Reg. No. 16066-38-9, di(sec-butyl) peroxydicarbonate of CAS Reg. No. 19910-65-7, di(2-ethylhexyl) peroxydicarbonate of CAS Reg. No. 16111-62-9, 1,1-dimethyl-3-hydroxybutyl peroxyneodecanoate of CAS Reg. No. 95718-78-8, α-cumyl peroxyneodecanoate of CAS Reg. No. 26748-47-0, α-cumyl peroxyneoheptanoate of CAS Reg. No. 104852-44-0, tert-amyl peroxyneodecanoate of CAS Reg. No. 68299-16-1, tert-butyl peroxyneodecanoate of CAS Reg. No. 26748-41-4, tert-amyl peroxypivalate of CAS Reg. No. 29240-17-3, tert-butyl peroxypivalate of CAS Reg. No. 927-07-1, 2,5-dimethyl-2,5-di(2-ethylhexanoylperoxy)hexane of CAS Reg. No. 13052-09-0, tert-amyl peroxy-2-ethylhexanoate of CAS Reg. No. 686-31-7, tert-butyl peroxy-2-ethylhexanoate of CAS Reg. No. 3006-82-4, tert-amyl peroxyacetate of CAS Reg. No. 690-83-5, tert-butyl peroxyacetate of CAS Reg. No. 107-71-1, tert-amyl perbenzoate of CAS Reg. No. 4511-39-1, tert-butyl perbenzoate of CAS Reg. No. 614-45-9, OO-tert-amyl-O(2-ethylhexyl) monoperoxycarbonate of CAS Reg. No. 70833-40-8, OO-tert-butyl-O-isopropyl monoperoxycarbonate of CAS Reg. No. 2372-21-6, OO-tert-butyl 1-(2-ethylhexyl) monoperoxycarbonate of CAS Reg. No. 34443-12-4, poly (tert-butyl peroxycarbonate) polyether of CAS Reg. No. 100-41-4, decanoyl peroxide of CAS Reg. No. 762-12-9, lauroyl peroxide of CAS Reg. No. 105-74-8, succinic acid peroxide of CAS Reg. No. 123-23-9, benzoyl peroxide of CAS Reg. No. 94-36-0, 1,1-di(tert-butylperoxy)-3,3,5-trimethylcyclohexane of CAS Reg. No. 6731-36-8, 1,1-di(tert-butylperoxy)cyclohexane of CAS Reg. No. 3006-86-8, 1,1-di(tert-amylperoxy)cyclohexane of CAS Reg. No. 15667-10-4, n-butyl 4,4-di(tert-butylperoxy)valerate of CAS Reg. No. 995-33-5, ethyl 3,3-di(tert-amylperoxy)butyrate of CAS Reg. No. 67567-23-1, tert-butyl peroctoate of CAS Reg. No. 3006-82-4, ethyl 3,3-di(tert-butylperoxy)butyrate of CAS Reg. No. 55794-20-2, cumene hydroperoxide of CAS Reg. No. 80-15-9, and tert-butyl hydroperoxide of CAS Reg. No. 75-91-2, are prepared on the site carrying out the free-radical polymerization or cross-linking, the process of synthesis then being defined as an ex situ process. By ex situ process is meant, consequently, the synthesis of organic peroxides on the site where a polymerization of at least one polymerizable monomer or a cross linking of at least one compound to be cross-linked is carried out. The organic peroxides are consumed immediately after their production, and there is therefore no longer any storage requirement or transport-related regulation.

The technology of micro-reactors or mini-reactors is based on a system of miniaturized reactors, mixers, heat exchangers, plate exchangers and other elements, which have structures on a scale which can range from the micrometer to the millimeter. The implementation of continuous processes in a closed reactor is one of the advantages of this technology. Furthermore, owing to the reduced size of channels, which have the function as a tube reactor, the technique is more effective than conventional batch reactors. This technology is particularly well suited to the safe synthesis of unstable chemical products such as the above selected organic peroxides, which undergo thermal decomposition.

By using a closed plate exchanger running as the technology of micro-reactor or mini-reactor, it's now possible to prepare, continuously, the above selected organic peroxides directly on the site where a process of free-radical polymerization or cross-linking is carried out; in particular, the above selected organic peroxides—even the most reactive ones—thus prepared, safely, can be conveyed directly to the polymerization or cross-linking reactor in the pure state, without solvents or stabilizers. The quality of the resultant polymers is therefore better.

The present invention accordingly provides a process of free-radical polymerization or cross-linking wherein at least one polymerizable monomer or at least one compound to be cross linked is contacted in the presence of at least one organic peroxide selected from the group consisting of di(n-propyl) peroxydicarbonate, di(sec-butyl) peroxydicarbonate, di(2-ethylhexyl) peroxydicarbonate, 1,1-di methyl-3-hydroxybutyl peroxyneodecanoate, α-cumyl peroxyneodecanoate, α-cumyl peroxyneoheptanoate, tert-amyl peroxyneodecanoate, tert-butyl peroxyneodecanoate, tert-amyl peroxypivalate, tert-butyl peroxypivalate, 2,5-dimethyl-2,5-di(2-ethylhexanoylperoxy)hexane, tert-amyl peroxy-2-ethylhexanoate, tert-butyl peroxy-2-ethylhexanoate, tert-amyl peroxyacetate, tert-butyl peroxyacetate, tert-amyl perbenzoate, tert-butyl perbenzoate, OO-tert-amyl-O(2-ethylhexyl) monoperoxycarbonate, OO-tert-butyl-O-isopropyl monoperoxycarbonate, OO-tert-butyl 1-(2-ethylhexyl) monoperoxycarbonate, poly(tert-butyl peroxycarbonate) polyether, decanoyl peroxide, lauroyl peroxide, succinic acid peroxide, benzoyl peroxide, 1,1-di(tert-butylperoxy)-3,3,5-trimethylcyclohexane, 1,1-di(tert-butylperoxy)cyclohexane, 1,1-di(tert-amylperoxy)cyclohexane, n-butyl 4,4-di(tert-butylperoxy)valerate, ethyl 3,3-di(tert-amylperoxy)butyrate, tert-butyl peroctoate, ethyl 3,3-di(tert-butylperoxy)butyrate, cumene hydroperoxide, and tert-butyl hydroperoxide, and mixtures thereof, characterized in that the organic peroxide is prepared continuously by an ex situ process with the aid of a closed plate exchanger.

More specifically the present invention provides a process of free-radical polymerization or cross-linking, wherein at least one polymerizable monomer or at least one compound to be cross-linked is contacted in the presence of at least one organic peroxide selected from the group consisting of di(n-propyl) peroxydicarbonate, di(sec-butyl) peroxydicarbonate, di(2-ethylhexyl) peroxydicarbonate, 1,1-di methyl-3-hydroxybutyl peroxyneodecanoate, α-cumyl peroxyneodecanoate, α-cumyl peroxyneoheptanoate, tert-amyl peroxyneodecanoate, tert-butyl peroxyneodecanoate, tert-amyl peroxypivalate, tert-butyl peroxypivalate, 2,5-dimethyl-2,5-di(2-ethylhexanoylperoxy)hexane, tert-amyl peroxy-2-ethylhexanoate, tert-butyl peroxy-2-ethylhexanoate, tert-amyl peroxyacetate, tert-butyl peroxyacetate, tert-amyl perbenzoate, tert-butyl perbenzoate, OO-tert-amyl-O(2-ethylhexyl) monoperoxycarbonate, OO-tert-butyl-O-isopropyl monoperoxycarbonate, OO-tert-butyl 1-(2-ethylhexyl) monoperoxycarbonate, poly(tert-butyl peroxycarbonate) polyether, decanoyl peroxide, lauroyl peroxide, succinic acid peroxide, benzoyl peroxide, 1,1-di(tert-butylperoxy)-3,3,5-trimethylcyclohexane, 1,1-di(tert-butylperoxy)cyclohexane, 1,1-di(tert-amylperoxy)cyclohexane, n-butyl 4,4-di(tert-butylperoxy)valerate, ethyl 3,3-di(tert-amylperoxy)butyrate, tert-butyl peroctoate, ethyl 3,3-di(tert-butylperoxy)butyrate, cumene hydroperoxide, and tert-butyl hydroperoxide, and mixtures thereof, said process comprising steps (a) to (d) implemented on the same site:

(a) preparation of the selected organic peroxide continuously with the aid of a closed plate exchanger, (b) transfer, where appropriate, of the reaction mixture from (a) to a purification unit, (c) transfer of the organic peroxide obtained in step (a) or in step (b) to a polymerization or cross-linking reactor, (d) free-radical polymerization or cross-linking reaction of at least one polymerizable monomer or of at least one compound to be cross-linked, in the presence of one or more organic peroxides transferred in step (c).

In a continuous reactor, sections of liquid are successively entering progressively one behind the other without ever mixing. The conventional tubular reactor possesses a limited heat exchange coefficient. Therefore the use of a plate exchanger will solve that problem.

In order to obtain high productivities, measured in l/h and relative to the volume of the reactor, it is necessary if the reactions are exothermic, the reactor must have a high exchange capacity, measured in terms of ratio of surface area to volume. If, moreover, in case of the above selected organic peroxides it is necessary to limit the maximum temperature attained, generally in the region of the reactor zone, along the flow channel by introducing the reactive materials at a plurality of points, so as to control this maximum temperature. Using plate exchangers allows good-quality of the reaction zone and good heat exchange can be obtained. Consequently it is possible to better control and manage the possible decomposition reactions of the organic peroxides.

In the process according to the invention, reactions can be carried out within a few seconds, even in the case of two-phase mixtures in case of reactions in micro-reactors or mini-reactors according to the process of the invention. Heat evaporation is facilitated by a high heat exchange capacity as expressed in terms of surface area relative to volume.

Hence, in terms of advantages with respect to the reaction medium, by comparison with data obtained from batch processes in conventional open reactors, for which the surface area/volume ratios are of the order of a few $m^2/m^3$, and in particular for rapid and exothermic reactions, it is possible to obtain better productivity, a better conversion, better selectivity, a better yield, and better quality for the organic peroxides formed, than those obtained with the prior-art processes. From a safety standpoint it is possible to carry out reactions without hazard, in temperature ranges higher than those habitually practised, and this has the effect of accelerating reaction rates and hence of further improving the productivity of the processes.

From an environmental aspect, the fact of implementing the preparation of heat-sensitive organic peroxides in closed exchangers will reduce the emissions of volatile organic compounds (VOC).

These systems exhibit other advantages in terms of flexibility, since it is possible to regulate the residence time by the number of plates making up the exchanger; the exchanger may be composed of a large number of mutually parallel plates.

In general plate exchangers which can be used according to the invention comprises at least two inlet points for the process of the reagents able to react to form the selected organic peroxides, preferably at least three inlets points. The number of inlet points is determined such that the temperature in the reaction zone does not exceed a predetermined value, which is generally the temperature above which the organic peroxide becomes unstable. In this way it is possible to carry out the inlet of the reagents able to react to form said organic peroxides at a number of inlets, whether in parallel or in series, and a single exchanger will be able to accept different reactants and to be used to prepare the above selected organic peroxides in accordance with very diverse reactions and varied operating conditions.

The plate exchangers which may be appropriate for the process of the invention are micro-reactors described in the prior art, for example the systems described in document EP 1 313 554 or in application WO 02/085511, the content of which is incorporated by reference.

These systems may further be enhanced by the installation of devices which allow the plates to be separated in the event of a runaway reaction, such as a climb in pressure or temperature resulting from a decomposition phenomenon. In the case of excess pressure, the exchanger, operating in closed mode, then becomes an open reactor in order to allow the product to be evacuated and to allow the problem to be managed in safety. These plate separation devices may be composed of a system allowing the plates to move apart, in particular of:

systems of nuts and bolts which deform plastically beyond a certain pressure, systems of nuts and bolts which are mounted with springs that undergo compression if the pressure in the reactor exceeds a predetermined value, systems of nuts and bolts which are mounted with elastic washers of Belleville washer type, calculated such that the plates separate by a predetermined distance if the pressure exceeds a defined value. This system has the advantage, moreover, of returning to its original state as soon as the pressure has fallen back below the defined value.

The free-radical initiators according to the invention are the above selected organic peroxides. The process according to the invention may be also carried out with organic peroxides selected from the group consisting of dialkyl peroxides and ketone peroxides.

The reactions carried out in order to obtain the above selected organic peroxides according to the invention are usually liquid/liquid reactions. They may take place in the presence of catalysts, in aqueous medium or in organic medium. It is possible to prepare mixtures of the above selected organic peroxides according to the invention.

The reaction sequences which lead to the formation of the organic peroxides set out above are described in Encyclopaedia of Chemical Technology, Kirk-Othmer, Fourth Edition, Vol. 18, 1996, pages 230-310.

In the process of the invention the rates of introduction of the reagents can vary within a wide range, possibly from 0.1 l/h to 5000 l/h, preferably from 0.1 l/h to 2000 l/h, in particular from 1 l/h to 2000 l/h.

The reagents are introduced with the aid of peristaltic pumps, metering pumps, self-priming transfer pumps or centrifugal pumps; preferably, metering pumps or the pumps used in liquid chromatography (HPLC) are employed on the laboratory scale, and centrifugal pumps on the industrial scale.

Thermocouples can be provided on the exchanger for measuring the temperature and for pressure measurements.

The temperature range for the reactions implemented ranges from 0 to 100° C., preferably from 5 to 60° C.

The internal pressure of the exchanger can be within the range from 0 to 5 bars relative to atmospheric pressure, but depends on the number of plates and on the introduction flow rates.

The residence time can be in the range from some seconds to a few minutes, preferably from 1 second to 45 seconds, in particular up to 2 to 3 minutes.

The heat transfer fluid may be composed of water, brine or a water/alcohol mixture. The temperature of the heat transfer fluid ranges from −20° C. to 90° C., and more particularly from 0 to 50° C.

A further advantage provided by the use of plate exchangers, relative to the existing technologies, is that of being able to prepare the above selected organic peroxides in the solid state, using a temperature greater then their melting temperature. It is also possible to prepare formulations based on the above selected organic peroxides, such as peroxide microemulsions.

The above selected organic peroxide thus prepared ex situ may be conveyed directly into a polymerization or cross-linking reactor, in which the reaction mixture obtained from the plate exchanger may be subjected to a final purification step, such as separation/washing, if necessary, and in this case is conveyed into a unit for continuous separation, such as, for example, that described in Chemical Engineers' Handbook, R. H. Perry/C. H. Chilton, Vol. 21, pp 11-12.

As already indicated above, the various advantages obtained by virtue of the continuous ex situ preparation of the above selected organic peroxides in plate exchangers are exploited in processes of polymerization of free-radically polymerizable monomers or in processes of cross-linking of compounds capable of being cross-linked free-radically.

The reason for this is that this continuous production allows the polymerization or cross-linking reactor to be fed continuously and in a regulated way, and, consequently, allows the above selected organic peroxide to be introduced continuously during the polymerization or cross linking reaction (known as "continuous dosing").

Continuous introduction is advantageous in order to enhance the kinetics of the polymerization or to produce resins at a high temperature that exhibit good thermal stability. Thus it is possible to obtain improved control over the heat of polymerization reaction over time, and to optimize the efficiency of the above selected organic peroxide, leading to improved yields and a reduction in the polymerization cycle. The level of residual organic peroxide in the resin is reduced, and the end properties of the resin are enhanced.

Other advantages consist in the fact that it is possible to introduce, directly and continuously, not only the above selected organic peroxides into the polymerization or cross-linking reactors, but also the above selected organic peroxides in the presence of various additives, such as those which may be included among the components of the polymerization, or else decomposition accelerators.

The processes of free-radical polymerization or cross-linking according to the invention are those which are commonly implemented in the thermoplastic resins or polymers industry; their operational conditions are known to the skilled person. Mention may be made in particular of the polymerization or copolymerization of vinyl monomers, more particularly the polymerization of vinyl chloride, ethylene, styrene or acrylic monomers, the thermosetting of unsaturated polyester resins and elastomers, the cross-linking of polyolefins, the grafting of polymers with the aid of vinyl monomers, and the modification of polypropylene. These processes are free-radical processes in bulk, in solution, in emulsion or in suspension at temperatures ranging from 30° C. to 250° C.

The efficiency of the above selected organic peroxide depends on its rate of thermal decomposition and on the efficiency of the radicals generated for the reaction which is implemented. The above selected organic peroxide is selected in accordance with half-life characteristics which are appropriate to the temperature and duration of the reaction which is implemented.

Accordingly, in the case of the suspension polymerization of the vinyl chloride, the reaction takes place at a temperature of 45-80° C. over a period of 3 to 10 hours. The above selected organic peroxides used in this polymerization have a 10-hour half-life temperature ranging generally from 20° C. to 85° C., more particularly from 20° C. to 50° C.

The invention accordingly further provides a process of suspension polymerization with vinyl chloride in the presence of at least one organic peroxide, characterized in that the organic peroxide is prepared continuously by an ex situ process with the aid of a closed plate exchanger and the organic peroxide is selected from the group consisting of di(n-propyl) peroxydicarbonate (of CAS Reg. No. 16066-38-9), di(sec-butyl) peroxydicarbonate (of CAS Reg. No. 19910-65-7), di(2-ethylhexyl) peroxydicarbonate (of CAS Reg. No. 16111-62-9), 1,1-dimethyl-3-hydroxybutyl peroxyneodecanoate (of CAS Reg. No. 95718-78-8), α-cumyl peroxyneodecanoate of CAS Reg. No. 26748-47-0, α-cumyl peroxyneoheptanoate (of CAS Reg. No. 104852-44-0), tert-amyl peroxyneodecanoate (of CAS Reg. No. 68299-16-1), tert-butyl peroxyneodecanoate (of CAS Reg. No. 26748-41-4), tert-amyl peroxypivalate (of CAS Reg. No. 29240-17-3), tert-butyl peroxypivalate (of CAS Reg. No. 927-07-1).

In the process of suspension polymerization of vinyl chloride according to the invention, the organic peroxide, which is defined above, is advantageously introduced continuously during the reaction, which opens up the possibility, further, of employing highly reactive organic peroxides defined above which decompose very rapidly in complete safety, these organic peroxides which would not be able to be effective under the conventional conditions of initiation of free-radical reactions.

The invention further provides a process of suspension polymerization of styrene in the presence of at least one organic peroxide selected from the group consisting of 2,5-dimethyl-2,5-di(2-ethylhexanoylperoxy)hexane (of CAS Reg. No. 13052-09-0), tert-butyl peroxy-2-ethylhexanoate (of CAS Reg. No. 3006-82-4), tert-amyl perbenzoate (of CAS Reg. No. 4511-39-1), tert-butyl perbenzoate (of CAS Reg. No. 614-45-9), OO-tert-amyl-O(2-ethylhexyl) monoperoxycarbonate (of CAS Reg. No. 70833-40-8), OO-tert-butyl-O-isopropyl monoperoxycarbonate (of CAS Reg. No. 2372-21-6), OO-tert-butyl 1-(2-ethylhexyl) monoperoxycarbonate (of CAS Reg. No. 34443-12-4), poly(tert-butyl peroxycarbonate) polyether (of CAS Reg. No. 100-41-4), decanoyl peroxide (of CAS Reg. No. 762-12-9), lauroyl peroxide (of CAS Reg. No. 105-74-8), succinic acid peroxide (of CAS Reg. No. 123-23-9), 1,1-di(tert-butylperoxy)-3,3,5-trimethylcyclohexane (of CAS Reg. No. 6731-36-8), characterized in that the organic peroxide is prepared continuously by an ex situ process with the aid of a closed plate exchanger.

This process leads primarily to expanded polystyrene.

The invention further provides a process of polymerization of acrylic monomers in the presence of at least one organic peroxide selected from the group consisting of 2,5-dimethyl-2,5-di(2-ethylhexanoylperoxy)hexane (of CAS Reg. No. 13052-09-0), tert-amyl peroxy-2-ethylhexanoate (of CAS Reg. No. 686-31-7), tert-butyl peroxy-2-ethylhexanoate (of CAS Reg. No. 3006-82-4), tert-amyl peroxyacetate (of CAS Reg. No. 690-83-5), tert-butyl peroxyacetate (of CAS Reg. No. 107-71-1), tert-amyl perbenzoate (of CAS Reg. No. 4511-39-1), characterized in that the organic peroxide is prepared continuously by an ex situ process with the aid of a closed plate exchanger.

In the process of suspension polymerization of styrene or the process of polymerization of acrylic monomers according to the invention, the organic peroxide, which is defined above, may be advantageously introduced continuously during the reaction.

Other processes of free-radical polymerization or cross-linking with organic peroxides selected from the group consisting of di(n-propyl) peroxydicarbonate of CAS Reg. No. 16066-38-9, di(sec-butyl) peroxydicarbonate of CAS Reg. No. 19910-65-7, di(2-ethylhexyl) peroxydicarbonate of CAS Reg. No. 16111-62-9, 1,1-dimethyl-3-hydroxybutyl peroxyneodecanoate of CAS Reg. No. 95718-78-8, α-cumyl peroxyneodecanoate of CAS Reg. No. 26748-47-0, α-cumyl peroxyneoheptanoate of CAS Reg. No. 104852-44-0, tert-amyl peroxyneodecanoate of CAS Reg. No. 68299-16-1, tert-butyl peroxyneodecanoate of CAS Reg. No. 26748-41-4, tert-amyl peroxypivalate of CAS Reg. No. 29240-17-3, tert-butyl peroxypivalate of CAS Reg. No. 927-07-1, 2,5-dimethyl-2,5-di(2-ethylhexanoylperoxy)hexane of CAS Reg. No. 13052-09-0, tert-amyl peroxy-2-ethylhexanoate of CAS Reg.

No. 686-31-7, tert-butyl peroxy-2-ethylhexanoate of CAS Reg. No. 3006-82-4, tert-amyl peroxyacetate of CAS Reg. No. 690-83-5, tert-butyl peroxyacetate of CAS Reg. No. 107-71-1, tert-amyl perbenzoate of CAS Reg. No. 4511-39-1, tert-butyl perbenzoate of CAS Reg. No. 614-45-9, OO-tert-amyl-O(2-ethylhexyl) monoperoxycarbonate of CAS Reg. No. 70833-40-8, OO-tert-butyl-O-isopropyl monoperoxycarbonate of CAS Reg. No. 2372-21-6, OO-tert-butyl 1-(2-ethylhexyl) monoperoxycarbonate of CAS Reg. No. 34443-12-4, poly(tert-butyl peroxycarbonate) polyether of CAS Reg. No. 100-41-4, decanoyl peroxide of CAS Reg. No. 762-12-9, lauroyl peroxide of CAS Reg. No. 105-74-8, succinic acid peroxide of CAS Reg. No. 123-23-9, benzoyl peroxide of CAS Reg. No. 94-36-0, 1,1-di(tert-butylperoxy)-3,3,5-trimethylcyclohexane of CAS Reg. No. 6731-36-8, 1,1-di(tert-butylperoxy)cyclohexane of CAS Reg. No. 3006-86-8, 1,1-di(tert-amylperoxy)cyclohexane of CAS Reg. No. 15667-10-4, n-butyl 4,4-di(tert-butylperoxy)valerate of CAS Reg. No. 995-33-5, ethyl 3,3-di(tert-amylperoxy)butyrate of CAS Reg. No. 67567-23-1, tert-butyl peroctoate of CAS Reg. No. 3006-82-4, ethyl 3,3-di(tert-butylperoxy)butyrate of CAS Reg. No. 55794-20-2, cumene hydroperoxide of CAS Reg. No. 80-15-9, and tert-butyl hydroperoxide of CAS Reg. No. 75-91-2 according to the invention are understood to mean processes which lead to thermoplastic polymers and/or elastomers, which can be defined as being natural or synthetic polymers having a thermoplastic and/or elastomeric character and which may be cross-linked (cured) under the action of a cross-linking agent. Rubber World, "Elastomer Crosslinking with Diperoxyketals", October 1983, pages 26-32, and Rubber and Plastic News, "Organic Peroxides for Rubber Cross-linking", 29 Sep. 1980, pages 46-50, describe the action of cross-linking and cross-linkable polymers.

Examples of polymers and/or elastomers include linear low-density polyethylene, low-density polyethylene, high-density polyethylene, chlorinated polyethylene, ethylene-propylene-diene terpolymers (EPDM), ethylene-vinyl acetate copolymers, ethylene-propylene copolymers, silicone rubber, natural rubber (NR), polyisoprene (IR), polybutadiene (BR), acrylonitrile-butadiene copolymers (NBR), styrene-butadiene copolymers (SBR). Chlorosulphonated polyethylene or fluoroelastomers, ethylene-methyl (meth) acrylate copolymers and ethylene-glycidyl methacrylate copolymers.

Mention may be made more particularly of the following:

High-pressure ethylene polymerization reactions, in which organic peroxides selected from the group consisting of 1,1-dimethyl-3-hydroxybutyl peroxyneodecanoate of CAS Reg. No. 95718-78-8, tert-amyl peroxyneodecanoate of CAS Reg. No. 68299-16-1, tert-butyl peroxyneodecanoate of CAS Reg. No. 26748-41-4, tert-amyl peroxypivalate of CAS Reg. No. 29240-17-3, tert-butyl peroxypivalate of CAS Reg. No. 927-07-1, tert-amyl peroxy-2-ethylhexanoate of CAS Reg. No. 686-31-7, tert-butyl peroxy-2-ethylhexanoate of CAS Reg. No. 3006-82-4, tert-amyl peroxyacetate of CAS Reg. No. 690-83-5, tert-butyl peroxyacetate of CAS Reg. No. 107-71-1, tert-amyl perbenzoate of CAS Reg. No. 4511-39-1, are generally employed.

The field of ABS (acrylonitrile-butadiene-styrene) polymers, in which organic peroxides selected from the group consisting of 2,5-dimethyl-2,5-di(2-ethylhexanoylperoxy) hexane of CAS Reg. No. 13052-09-0, tert-butyl peroxy-2-ethylhexanoate of CAS Reg. No. 3006-82-4, tert-amyl perbenzoate of CAS Reg. No. 4511-39-1, tert-butyl perbenzoate of CAS Reg. No. 614-45-9, OO-tert-amyl-O(2-ethylhexyl) monoperoxycarbonate of CAS Reg. No. 70833-40-8, OO-tert-butyl-O-isopropyl monoperoxycarbonate of CAS Reg. No. 2372-21-6, OO-tert-butyl 1-(2-ethylhexyl) monoperoxycarbonate of CAS Reg. No. 34443-12-4, poly(tert-butyl peroxycarbonate) polyether of CAS Reg. No. 100-41-4, decanoyl peroxide of CAS Reg. No. 762-12-9, lauroyl peroxide of CAS Reg. No. 105-74-8, succinic acid peroxide of CAS Reg. No. 123-23-9, 1,1-di(tert-butylperoxy)-3,3,5-trimethylcyclohexane of CAS Reg. No. 6731-36-8, are generally used.

The thermosetting of polyester resins, in which organic peroxides selected from the group consisting of tert-butyl peroxy-2-ethylhexanoate of CAS Reg. No. 3006-82-4, tert-butyl perbenzoate of CAS Reg. No. 614-45-9, OO-tert-amyl-O(2-ethylhexyl) monoperoxycarbonate of CAS Reg. No. 70833-40-8, OO-tert-butyl-O-isopropyl monoperoxycarbonate of CAS Reg. No. 2372-21-6, OO-tert-butyl 1-(2-ethylhexyl) monoperoxycarbonate of CAS Reg. No. 34443-12-4, benzoyl peroxide of CAS Reg. No. 94-36-0, 1,1-di(tert-butylperoxy)-3,3,5-trimethylcyclohexane of CAS Reg. No. 6731-36-8, 1,1-di(tert-butylperoxy)cyclohexane of CAS Reg. No. 3006-86-8, tert-butyl peroctoate of CAS Reg. No. 3006-82-4, cumene hydroperoxide of CAS Reg. No. 80-15-9, and tert-butyl hydroperoxide of CAS Reg. No. 75-91-2, are generally employed.

The thermosetting of elastomers, such as ethylene propylene copolymers (EPR), ethylene-propylene-diene terpolymers (EPDM), silicone rubber, natural rubber (NR), and in the course of which the following peroxides may be employed: benzoyl peroxide of CAS Reg. No. 94-36-0, 1,1-di(tert-butylperoxy)-3,3,5-trimethylcyclohexane of CAS Reg. No. 6731-36-8, 1,1-di(tert-butylperoxy)cyclohexane of CAS Reg. No. 3006-86-8, n-butyl 4,4-di(tert-butylperoxy)valerate of CAS Reg. No. 995-33-5.

The crosslinking of polyolefins such as linear low-density polyethylene (LLDPE), low-density polyethylene (LDPE), high-density polyethylene (HDPE), in the presence of benzoyl peroxide of CAS Reg. No. 94-36-0, 1,1-di(tert-butylperoxy)-3,3,5-trimethylcyclohexane of CAS Reg. No. 6731-36-8, 1,1-di(tert-butylperoxy)cyclohexane of CAS Reg. No. 3006-86-8, n-butyl 4,4-di(tert-butylperoxy)valerate of CAS Reg. No. 995-33-5.

The present invention further provides the thermoplastic polymers and/or elastomers thus obtained.

The examples, which follow illustrate the invention without, however, limiting its scope.

Example 1

Figure 2:
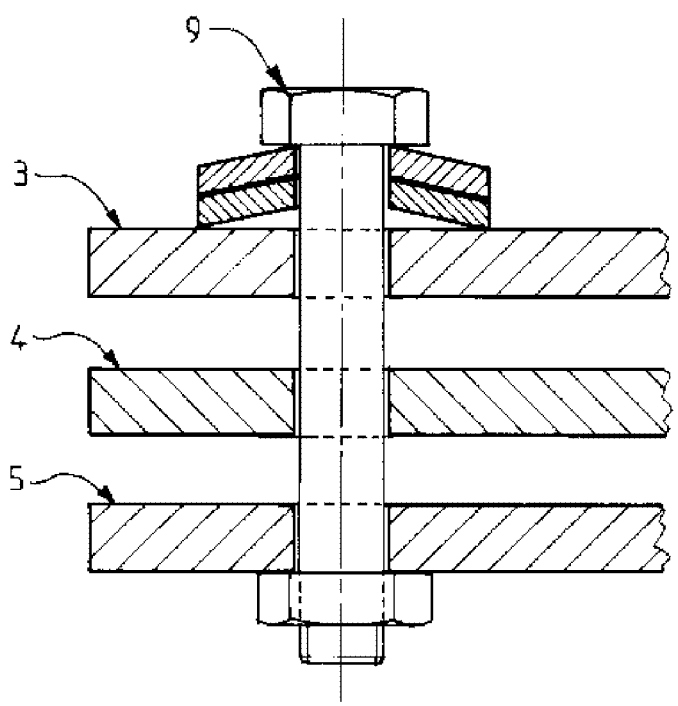
FIG. 2 is a cross sectional view along line II-II of FIG. 1.

Example of a Plate Exchanger Useful in the Process According to the Invention, as Referred to in FIGS. 1 and 2

This exchanger 1 comprises 3 parallel plates 3,4,5, in contact with one another defining chambers connected in series, for the synthesis, for example, of compounds of the above selected organic peroxide type, which are held in contact with one another during the synthesis with the aid of nuts and bolts 9. This system 9, the detail of which is shown in FIG. 2, may be opened, in the case of a rise in pressure or temperature, in order to move the 2 plates apart and to evacuate the reagents in total safety. In the event of leakage or poor functioning, the use of micro-reactors allows a small exit of products, thus limiting the risks of accident or explosion. This exchanger contains a number of inlet points 11 for the reagents required for the production of the above defined organic peroxides. A cooling system (not shown in the figure), whose structure is well known to the skilled person, allows the system to be cooled by the circulation of a heat transfer fluid.

Example 2 one embodiment of the process according to the invention wherein the organic peroxide is introduced continuously during PVC polymerization.

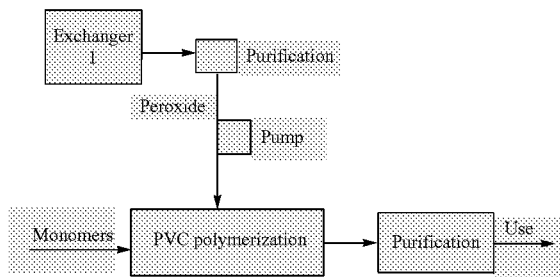

Example 3

Suspension Polymerization of Vinyl Chloride

Preparation of di(2-ethylhexyl) peroxydicarbonate (known commercially as Luperoxe 223)

A closed plate exchanger as represented in FIG. 1 but comprising 6 additional plates is used.

2.62 l/h of a 8% NaOH sodium hydroxide solution are introduced continuously into the plate exchanger via point $11a$, and 0.19 l/h of a 70% hydrogen peroxide H2O2 solution are introduced via point $11b$. After the reaction at 22° C. in the first plate, 2-ethylhexyl chloroformate is subsequently introduced continuously, via point $11c$ into the second plate, at a flow rate of 0.99 l/h. The reaction is carried out at 25° C. in the following 8 plates. The di(2-ethylhexyl) peroxydicarbonate is obtained with a yield of 26%, expressed relative to the chloroformate.

The total flow produced in the exchanger is fed in the polymerisation reactor during 85 s, corresponding then to 96.9 g of solution containing 5.45 g of di(2-ethylhexyl) peroxydicarbonate Preparation of PVC resin in the presence of Luperoxc 223 beforehand prepared in the plate exchanger
14 kg of demineralized water, 2.52 g of citric acid, 3.73 g of polyvinyl alcohol having a degree of hydrolysis of 78 molar %, 3.73 g of polyvinyl alcohol having a degree of hydrolysis of 72 molar %, 8.08 g of an aqueous solution (comprising 39% of active material) of polyvinyl alcohol having a degree of hydrolysis of 55 molar % and 96.9 g of the solution prepared in the exchanger comprising 5.45 g of di(2-ethylhexyl) peroxydicarbonate, are introduced, at ambient temperature and with stirring (250 r/min), into a reactor with a capacity of 30 liters which is equipped with a stirrer of impeller type comprising three arms and with a jacket. The content of active oxygen is then 28 ppm with respect to the weight of the vinyl chloride monomer (VCM), which will subsequently be charged.

After having closed the reactor, it is placed under partial vacuum (6.66 kPa absolute), which vacuum is maintained for 15 minutes. The stirring is subsequently brought to 330 r/min and 9 kg of VCM are then introduced.

The heating is regulated by circulation of cold water in the jacket to reach, in 30 minutes, the polymerization temperature of 56° C. The moment when the polymerization medium reaches 56° C. is regarded as the beginning of the polymerization (time=$t_0$) and the pressure at this instant ($P_0$) is then taken as reference.

After polymerizing for 30 minutes (i.e. at time $t_0$+30 min), 4 kg of water are introduced continuously into the reactor with a constant flow rate of 1.2 kg/h to improve the heat exchange while keeping constant the exchange surface area of the jacket and to decrease the viscosity of the aqueous suspension after 60% of conversion of the VCM to PVC, which conversion is calculated by a heat balance determined at the limits of the reactor.

The depletion of the VCM gas phase in the reactor is reflected by a fall in pressure between 65 and 70% conversion. As soon as the pressure has fallen by 1 bar with respect to $P_0$, the polymerization is stopped by rapid cooling of the medium by means of cold water injected into the jacket.

The residual content of di(2-ethylhexyl) peroxydicarbonate is approximately 90 ppm by weight with respect to the initial weight of monomer.

The residual VCM is subsequently removed from the reaction medium by conventional techniques of returning to atmospheric pressure (degassing) and the traces of VCM are subsequently removed by degassing under a vacuum of 13.33 kPa at 50° C. (stripping).

A total amount of PVC resin of 7.6 kg is obtained.

The invention claimed is:

1. A process of free-radical polymerization or cross-linking comprising the steps of contacting:
   a) at least one polymerizable monomer or at least one compound to be cross-linked and
   b) at least one organic peroxide selected from the group consisting of di(n-propyl) peroxydicarbonate, di(sec-butyl) peroxydicarbonate, di(2-ethylhexyl) peroxydicarbonate, 1,1-dimethyl-3-hydroxybutyl peroxyneodecanoate, α-cumyl peroxyneodecanoate, α-cumyl peroxyneoheptanoate, tert-amyl peroxyneodecanoate, tert-butyl peroxyneodecanoate, tert-amyl peroxypivalate, tert-butyl peroxypivalate, 2,5-dimethyl-2,5-di(2-ethylhexanoylperoxy)hexane, tert-amyl peroxy-2-ethylhexanoate, tert-butyl peroxy-2-ethyl hexanoate, tert-amyl peroxyacetate, tert-butyl peroxyacetate, tert-amyl perbenzoate, tert-butyl perbenzoate, OO-tert-amyl-O(2-ethylhexyl) monoperoxycarbonate, OO-tert-butyl-O-isopropyl monoperoxycarbonate, OO-tert-butyl 1-(2-ethylhexyl) monoperoxycarbonate, poly(tert-butyl peroxycarbonate) polyether, decanoyl peroxide, lauroyl peroxide, succinic acid peroxide, benzoyl peroxide, 1,1-di(tert-butylperoxy)-3,3,5-trimethylcyclohexane, 1,1-di(tert-butylperoxy)cyclohexane, 1,1-di(tert-amylperoxy) cyclohexane, n-butyl 4,4-di(tert-butylperoxy)valerate, ethyl 3,3-di(tert-amylperoxy)butyrate, tert-butyl peroctoate, ethyl 3,3-di(tert-butylperoxy)butyrate, cumene hydroperoxide, and tert-butyl hydroperoxide, and mixtures thereof;
   wherein the organic peroxide is prepared continuously by an ex situ process with the aid of a closed plate exchanger and reagents for forming the organic peroxide are introduced into the closed plate exchanger at a rate ranging from 1 liter/hour to 2000 liters/hour,
   the closed plate exchanger comprising plates and a plate separation device allowing the plates to move apart, wherein said plate separation device is selected from the group consisting of i) a system of nuts and bolts which are mounted with springs that undergo compression if the pressure in the reactor exceeds a predetermined value or ii) a system of nuts and bolts which are mounted with elastic washers of Belleville type such that the plates separate by a predetermined distance if the pressure exceeds a defined value.

2. The process according to claim 1, characterized in that the organic peroxide is prepared at a temperature ranging from about 0° C. to about 100° C.

3. The process according to claim 1, characterized in that the organic peroxide is prepared at a temperature ranging from about 5° C. to about 60° C.

4. The process according to claim 1, characterized in that the plate exchanger comprises at least two inlet points for the reagents.

5. The process according to claim 1, characterized in that the plate exchanger comprises at least three inlet points.

6. The process according to claim 1, characterized in that the organic peroxide is introduced continuously during the free-radical polymerization or cross-linking reaction.

7. The process according to claim 1, characterized in that the free-radical polymerization or cross-linking is selected from polymerization or copolymerization of vinyl monomers, the thermosetting of unsaturated polyester resins and elastomers, the cross-linking of polyolefins, or the grafting of polymers with the aid of vinyl monomers.

8. A process of suspension polymerization comprising the steps of contacting vinyl chloride and at least one organic peroxide selected from the group consisting of di(n-propyl) peroxydicarbonate, di(sec-butyl) peroxydicarbonate, di(2-ethylhexyl) peroxydicarbonate, 1,1-dimethyl-3-hydroxybutyl peroxyneodecanoate, α-cumyl peroxyneodecanoate, α-cumyl peroxyneoheptanoate, tert-amyl peroxyneodecanoate, tert-butyl peroxyneodecanoate, tert-amyl peroxypivalate, and tert-butyl peroxypivalate, and mixtures thereof;

wherein the organic peroxide is prepared continuously by an ex situ process in a closed plate exchanger and reagents for forming the organic peroxide are introduced into the closed plate exchanger at a rate ranging from 1 liter/hour to 2000 liters/hour,
the closed plate exchanger comprising plates and a plate separation device allowing the plates to move apart, wherein said plate separation device is selected from the group consisting of i) a system of nuts and bolts which are mounted with springs that undergo compression if the pressure in the reactor exceeds a predetermined value or ii) a system of nuts and bolts which are mounted with elastic washers of Belleville type such that the plates separate by a predetermined distance if the pressure exceeds a defined value.

9. The process according to claim 8, characterized in that the organic peroxide is introduced continuously during the polymerization reaction.

10. A process of suspension polymerization of styrene comprising the steps of contacting styrene and at least one organic peroxide selected from the group consisting of 2,5-dimethyl-2,5-di(2-ethylhexanoylperoxy)hexane, tert-butyl peroxy-2-ethyl hexanoate, tert-amyl perbenzoate, tert-butyl perbenzoate, OO-tert-amyl-O(2-ethylhexyl) monoperoxycarbonate, OO-tert-butyl-O-isopropyl monoperoxycarbonate, OO-tert-butyl 1-(2-ethylhexyl) monoperoxycarbonate, poly(tert-butyl peroxycarbonate) polyether, decanoyl peroxide, lauroyl peroxide, succinic acid peroxide, 1,1-di(tert-butylperoxy)-3,3,5-trimethylcyclohexane;

wherein the organic peroxide is prepared continuously by an ex situ process in a closed plate exchanger, the closed plate exchanger comprising plates and a plate separation device allowing the plates to move apart, wherein said plate separation device is selected from the group consisting of i) a system of nuts and bolts which are mounted with springs that undergo compression if the pressure in the reactor exceeds a predetermined value or ii) a system of nuts and bolts which are mounted with elastic washers of Belleville type such that the plates separate by a predetermined distance if the pressure exceeds a defined value.

11. A process of polymerization of acrylic monomers comprising the steps of contacting one or more acrylic monomers and at least one organic peroxide selected from the group consisting of 2,5-dimethyl-2,5-di(2-ethylhexanoylperoxy) hexane, tert-amyl peroxy-2-ethylhexanoate, tert-butyl peroxy-2-ethylhexanoate, tert-amyl peroxyacetate, tert-butyl peroxyacetate, tert-amyl perbenzoate;

wherein the organic peroxide is prepared continuously by an ex situ process in a closed plate exchanger, the closed plate exchanger comprising plates and a plate separation device allowing the plates to move apart, wherein said plate separation device is selected from the group consisting of i) a system of nuts and bolts which are mounted with springs that undergo compression if the pressure in the reactor exceeds a predetermined value or ii) a system of nuts and bolts which are mounted with elastic washers of Belleville type such that the plates separate by a predetermined distance if the pressure exceeds a defined value.

12. A process of free-radical polymerization or cross-linking comprising the steps of contacting at least one polymerizable monomer or a compound to be cross-linked and at least one organic peroxide selected from the group consisting of di(n-propyl) peroxydicarbonate, di(sec-butyl) peroxydicarbonate, di(2-ethylhexyl) peroxydicarbonate, 1,1-dimethyl-3-hydroxybutyl peroxyneodecanoate, α-cumyl peroxyneodecanoate, α-cumyl peroxyneoheptanoate, tert-amyl peroxyneodecanoate, tert-butyl peroxyneodecanoate, tert-amyl peroxypivalate, tert-butyl peroxypivalate, 2,5-dimethyl-2,5-di(2-ethylhexanoylperoxy)hexane, tert-amyl peroxy-2-ethylhexanoate, tert-butyl peroxy-2-ethyl hexanoate, tert-amyl peroxyacetate, tert-butyl peroxyacetate, tert-amyl perbenzoate, tert-butyl perbenzoate, OO-tert-amyl-O(2-ethylhexyl) monoperoxycarbonate, OO-tert-butyl-O-isopropyl monoperoxycarbonate, OO-tert-butyl 1-(2-ethylhexyl) monoperoxycarbonate, poly(tert-butyl peroxycarbonate) polyether, decanoyl peroxide, lauroyl peroxide, succinic acid peroxide, benzoyl peroxide, 1,1-di(tert-butylperoxy)-3,3,5-trimethylcyclohexane, 1,1-di(tert-butylperoxy)cyclohexane, 1,1-di(tert-amylperoxy)cyclohexane, n-butyl 4,4-di(tert-butylperoxy)valerate, ethyl 3,3-di(tert-amylperoxy)butyrate, tert-butyl peroctoate, ethyl 3,3-di(tert-butylperoxy)butyrate, cumene hydroperoxide, and tert-butyl hydroperoxide, and mixtures thereof, wherein the process further comprises:

(a) preparing a selected organic peroxide continuously in a closed plate exchanger, wherein reagents for forming the selected organic peroxide are introduced into the closed plate exchanger at a rate ranging from 1 liter/hour to 2000 liters/hour, the closed plate exchanger comprising plates and a plate separation device allowing the plates to move apart, wherein said plate separation device is selected from the group consisting of i) a system of nuts and bolts which are mounted with springs that undergo compression if the pressure in the reactor exceeds a predetermined value or ii) a system of nuts and bolts which are mounted with elastic washers of Belleville type such that the plates separate by a predetermined distance if the pressure exceeds a defined value, (b) optionally transferring the organic peroxide from step (a) to a purification unit,
(c) optionally transferring the organic peroxide obtained in step (a) or in step (b) to a polymerization or cross-linking reactor, and
(d) free-radical polymerizing or cross-linking the at least one polymerizable monomer or the at least one compound to be cross-linked, with one or more organic peroxides from steps (a), (b) or (c).

* * * * *